(12) United States Patent
Foley et al.

(10) Patent No.: US 11,449,710 B2
(45) Date of Patent: Sep. 20, 2022

(54) APPARATUS AND METHOD FOR IMPROVED INTERFACE-BASED DECISION ANALYSIS

(71) Applicant: Optum Services (Ireland) Limited, Dublin (IE)

(72) Inventors: Colum Foley, County Dublin (IE); Jennifer M. Bakker, Pasadena, CA (US); Danial Clements, Monaghan (IE)

(73) Assignee: OPTUM SERVICES (IRELAND) LIMITED, Dublin (IE)

(*) Notice: Subject to any disclaimer, the term of this patent is extended or adjusted under 35 U.S.C. 154(b) by 194 days.

(21) Appl. No.: 16/017,185

(22) Filed: Jun. 25, 2018

(65) Prior Publication Data

US 2019/0392257 A1 Dec. 26, 2019

(51) Int. Cl.
| | |
|---|---|
| *G06F 3/04842* | (2022.01) |
| *G06N 20/00* | (2019.01) |
| *G06K 9/62* | (2022.01) |
| *G06F 16/28* | (2019.01) |
| *G06V 30/414* | (2022.01) |

(52) U.S. Cl.
CPC ....... *G06K 9/6257* (2013.01); *G06F 3/04842* (2013.01); *G06F 16/289* (2019.01); *G06N 20/00* (2019.01); *G06V 30/414* (2022.01)

(58) Field of Classification Search
CPC .... G06F 16/289; G06F 16/55; G06F 3/04842; G06K 9/00463; G06K 9/6257; G06N 20/00
See application file for complete search history.

(56) References Cited

U.S. PATENT DOCUMENTS

| | | |
|---|---|---|
| 7,725,330 B2 | 5/2010 | Rao et al. |
| 10,169,678 B1* | 1/2019 | Sachdeva ............ G05D 1/0221 |
| 2005/0137912 A1 | 6/2005 | Rao et al. |
| 2010/0145734 A1 | 6/2010 | Becerra et al. |
| 2012/0166212 A1 | 6/2012 | Campbell |
| 2012/0185275 A1 | 7/2012 | Loghmani |
| 2013/0054259 A1 | 2/2013 | Wojtusiak et al. |
| 2014/0149128 A1 | 5/2014 | Getchius |
| 2017/0169567 A1* | 6/2017 | Chefd'hotel ........ G06T 7/0012 |
| 2017/0323061 A1 | 11/2017 | D'Souza et al. |
| 2018/0373711 A1* | 12/2018 | Ghatage ................. H04N 1/04 |
| 2019/0172581 A1* | 6/2019 | Zlotnick ............... G06N 20/10 |

* cited by examiner

*Primary Examiner* — Anhtai V Tran
*Assistant Examiner* — Xiaoqin Hu
(74) *Attorney, Agent, or Firm* — Alston & Bird LLP

(57) ABSTRACT

An apparatus, method, and computer program product for the improved development of training data sets for use in connection with machine learning models capable of operating on natural language data records and other unstructured data in a network environment. Some example implementations provide for the generation and presentation of record images in a user interface that allows captures user actions reflecting higher-order data analysis and discernment for incorporation into training protocols used for machine learning models.

15 Claims, 6 Drawing Sheets

APPARATUS AND METHOD FOR IMPROVED INTERFACE-BASED DECISION ANALYSIS

TECHNICAL FIELD

An example embodiment relates generally to machine learning, particularly in the context of the development of training data sets for use in training deep learning and other machine learning models. Example implementations are particularly directed to systems, methods, and apparatuses for efficiently converting user interactions with a user interface to develop training datasets and trained models capable of performing sophisticated analysis of complex natural language documents.

BACKGROUND

The effective and efficient collection, processing, and analysis of mission-critical data has become a central requirement in many modern environments. Many modern service providers are increasing required to develop, maintain, and assess extremely high volumes of data as part of their everyday, fundamental operations. While recent developments in machine learning models and other similar systems have provided a path forward in many contexts where high data-processing throughput is required, the effectiveness of many such machine learning models is often highly dependent on the quality of the training data used in connection with such models. As a result, many machine learning models struggle to provide effective, reliable results in environments where the underlying data typically requires humans to apply reasoned, subtle judgments as part of the required analysis. This is particularly true in situations where the underlying data takes the form of unstructured documentation containing qualitative and/or subjective observations expressed using natural language.

In network environments where essential functions rely on the analysis and processing of large volumes of natural language information, the technical challenges associated with applying large volumes of data to a machine learning model are compounded by the technical challenges associated with ensuring that the model is appropriately trained using training data that reflects the deep analysis performed by human reviewers of natural language documents. The inventors of the inventions disclosed herein have identified these and other technical challenges, and developed the solutions described and otherwise referenced herein.

BRIEF SUMMARY

An apparatus, computer program product, and method are therefore provided in accordance with an example embodiment in order permit the efficient conversion of human interactions with data records and related images within a user interface into training data that can be effectively applied to a machine learning model. Many of the technical challenges that impede the efficiency of training and using conventional machine learning systems are overcome in example embodiments described herein by efficiently capturing user actions and correlating such actions with the relevant data presented within a generated interface. Moreover, some example embodiments provide for the tracking and/or other recordation of actions taken by a user within a user interface in a manner that allows for the correlation between the viewing, selection and/or other interaction with a portion of a record image and/or the content therein to a particular user-selected categorization or other user-determined assessment. As such, some example embodiments allow for the creation and/or development of machine learning training data that reflects the complex assessments and discernments made by a human user interacting with a natural language data record in a manner that allows for a machine learning model to develop comparable levels of data discernment and analysis.

In an example embodiment, a method for automatically extracting decision-relevant information from a data record comprising natural language information is provided, the method comprising: receiving, at a decision analysis system, a record data object; extracting, from the record data object, a record image set; rendering, in a user interface, a record image from the record image set; rendering, in the user interface, a selectable objects set; collecting, from the user interface, a user action set, wherein the user action set comprises a plurality of indications of actions performed by the user within the user interface; and applying the user action set to a training data set associated with a machine learning model.

In some example implementations of such a method, the record image set comprises at least one image of a document, wherein the document comprises human-readable, natural language content. In some such example implementations, and in other example implementations, the record image set further comprise a set of extracted character information associated with the document. In some such example implementations, and in other example implementations, the user action set comprises an indication of one or more user-selected objects from within the selectable objects set and an identification of the record image. In some such example implementations, and in other example implementations, the user action set comprises an identification of a set of user interactions with the user interface. In some such example implementations, and in other example implementations, the user action set further comprises an identification of a portion of the record image associated with the one or more user-selected objects from with the selectable objects set. In some such example implementations, and in other example implementations, the user action set further comprises an identification of a user-selected portion of the record image associated with the one or more user-selected objects from within the selectable objects set.

In another example embodiment, an apparatus for automatically extracting decision-relevant information from a data record comprising natural language information is provided, the apparatus comprising at least one processor and at least one memory comprising computer program code, the at least one memory and the computer program code configured to, with the at least one processor, cause the apparatus to: receive a record data object; extract, from the record data object, a record image set; render, in a user interface of the apparatus, a record image from the record image set; render, in the user interface of the apparatus, a selectable objects set; collect, from the user interface, a user action set, wherein the user action set comprises a plurality of indications of actions performed by the user within the user interface; and apply the user action set to a training data set associated with a machine learning model.

In some example implementations of such an apparatus, the record image set comprises at least one image of a document, wherein the document comprises human-readable, natural language content. In some such example implementations, and in other example implementations, the record image set further comprise a set of extracted character information associated with the document. In some such example implementations, and in other example implementations, the user action set comprises an indication of one or more user-selected objects from within the selectable objects set and an identification of the record image. In some such example implementations, and in other example implementations, the user action set comprises an identification of a set of user interactions with the user interface. In some such example implementations, and in other example implementations, the user action set further comprises an identification of a portion of the record image associated with the one or more user-selected objects from with the selectable objects set. In some such example implementations, and in other example implementations, the user action set further comprises an identification of a user-selected portion of the record image associated with the one or more user-selected objects from within the selectable objects set.

In another example embodiment, a computer program product is provided, the computer program product comprising at least one non-transitory computer-readable storage medium having computer-executable program code instructions stored therein, the computer-executable program code instructions comprising program code instructions configured to: receive a record data object; extract, from the record data object, a record image set; render, in a user interface, a record image from the record image set; render, in the user interface, a selectable objects set; collect, from the user interface, a user action set, wherein the user action set comprises a plurality of indications of actions performed by the user within the user interface; and apply the user action set to a training data set associated with a machine learning model In some example implementations of such a computer program product, the record image set comprises at least one image of a document, wherein the document comprises human-readable, natural language content. In some such example implementations, and in other example implementations, the record image set further comprise a set of extracted character information associated with the document. In some such example implementations, and in other example implementations, the user action set comprises an indication of one or more user-selected objects from within the selectable objects set and an identification of the record image. In some such example implementations, and in other example implementations, the user action set comprises an identification of a set of user interactions with the user interface. In some such example implementations, and in other example implementations, the user action set further comprises an identification of a portion of the record image associated with the one or more user-selected objects from with the selectable objects set.

BRIEF DESCRIPTION OF THE DRAWINGS

Figure 1:
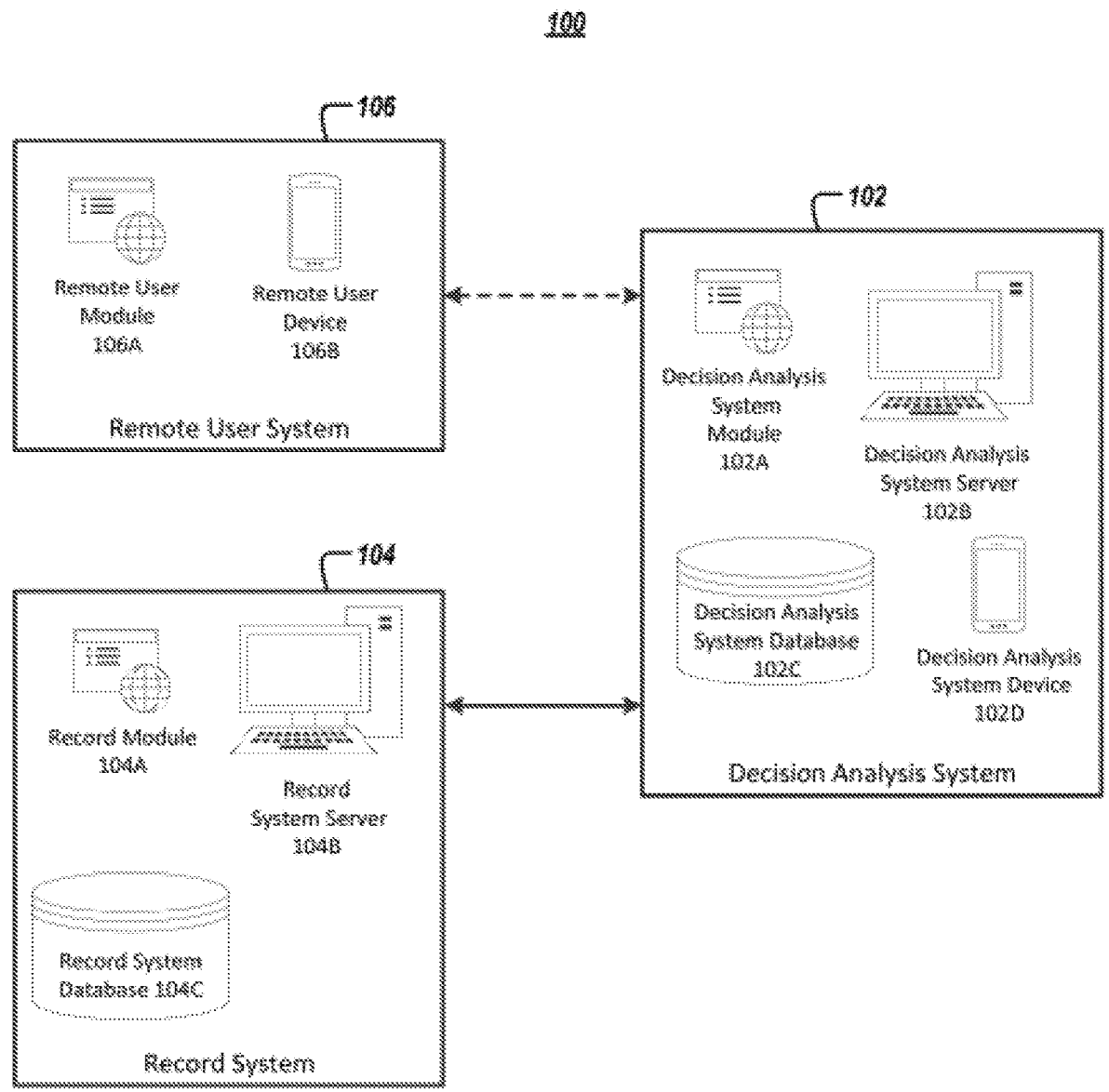
Figure 2:
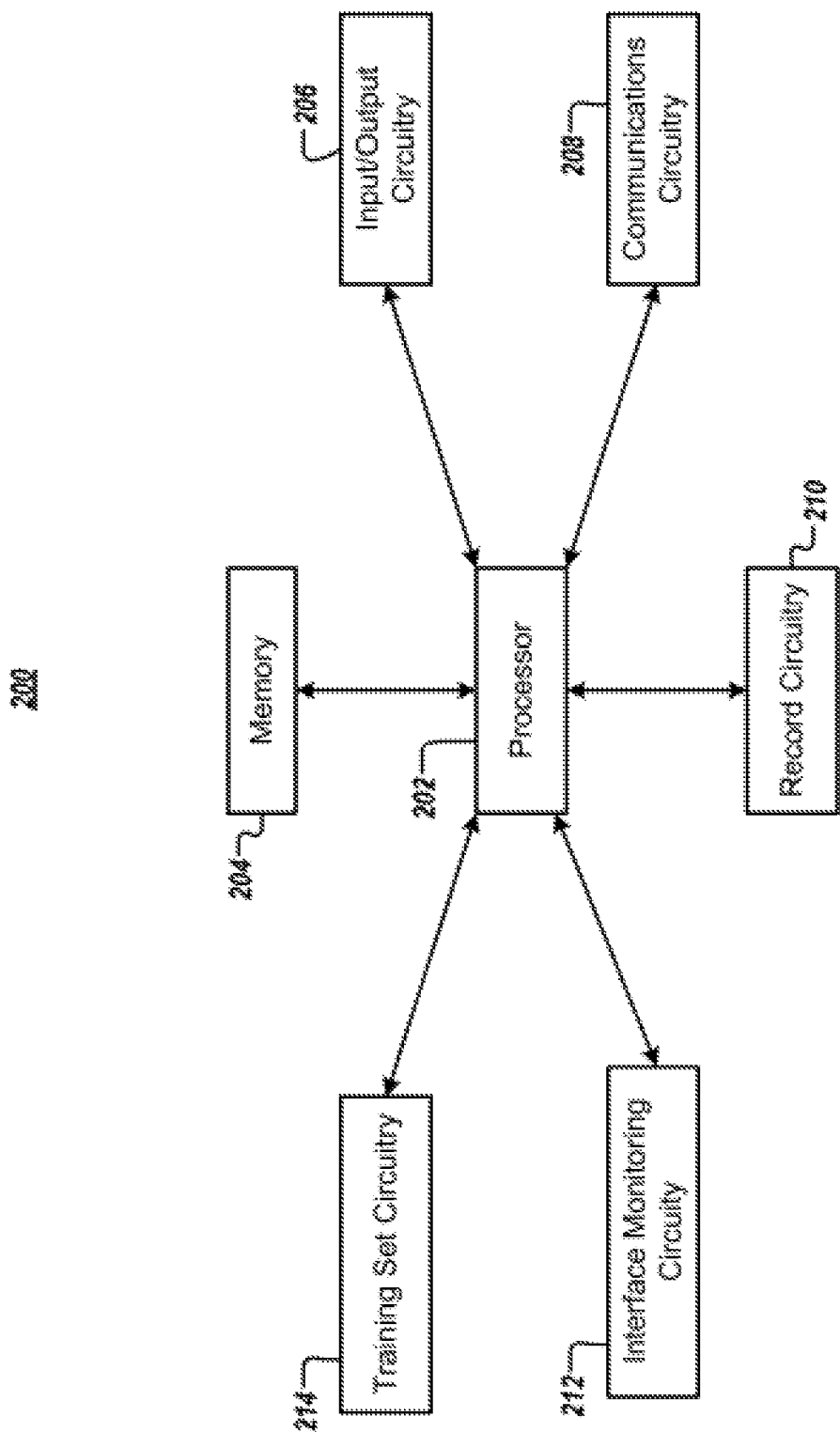
Figure 3:
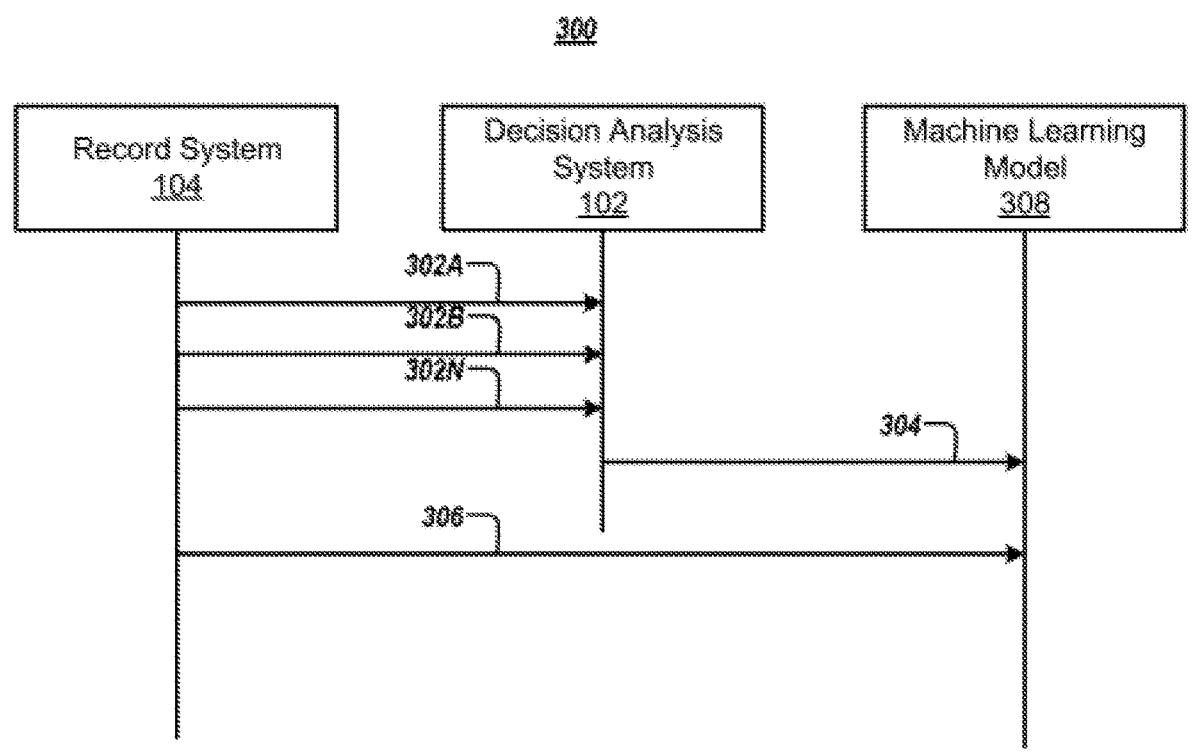
Figure 4:
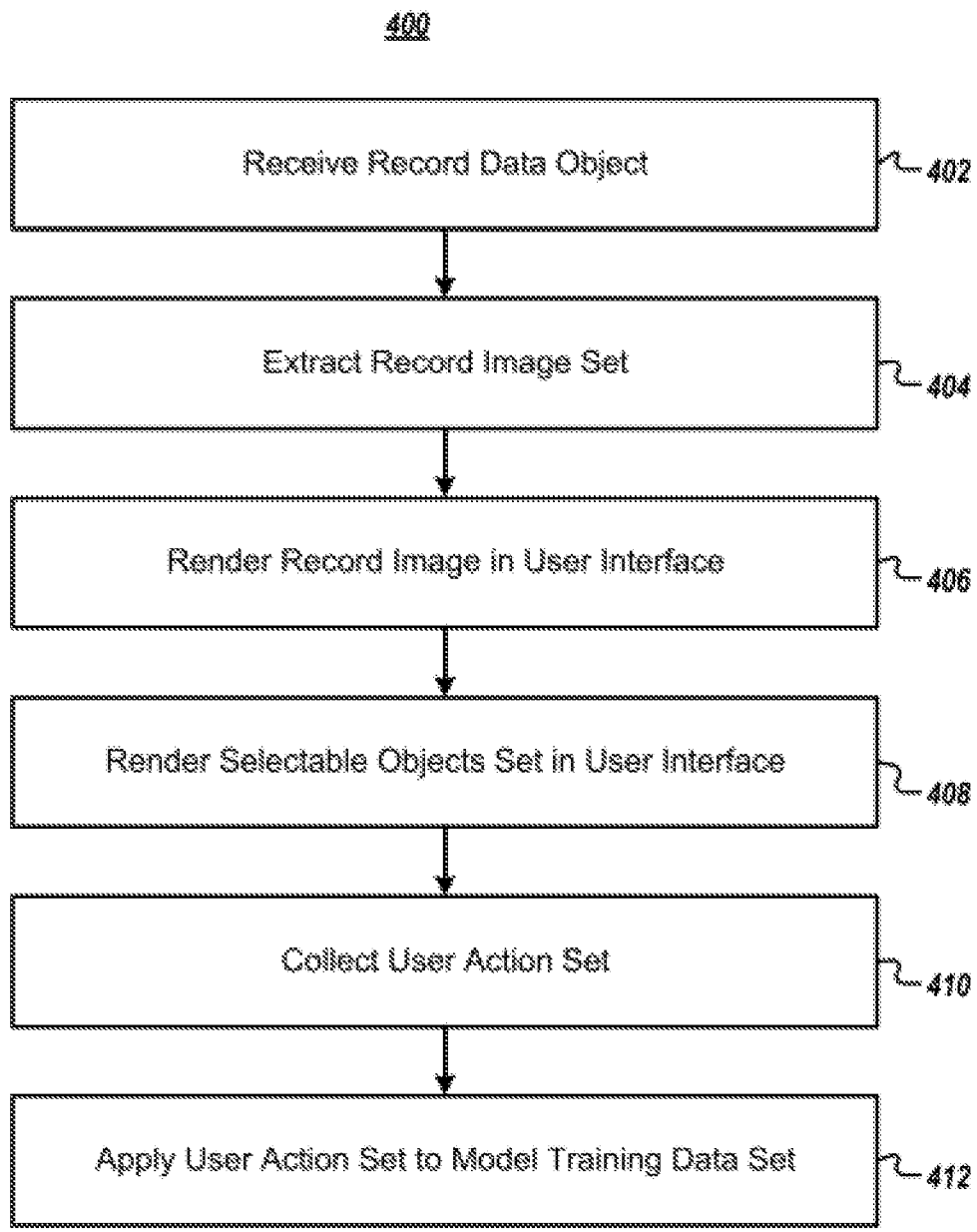
Figure 5:
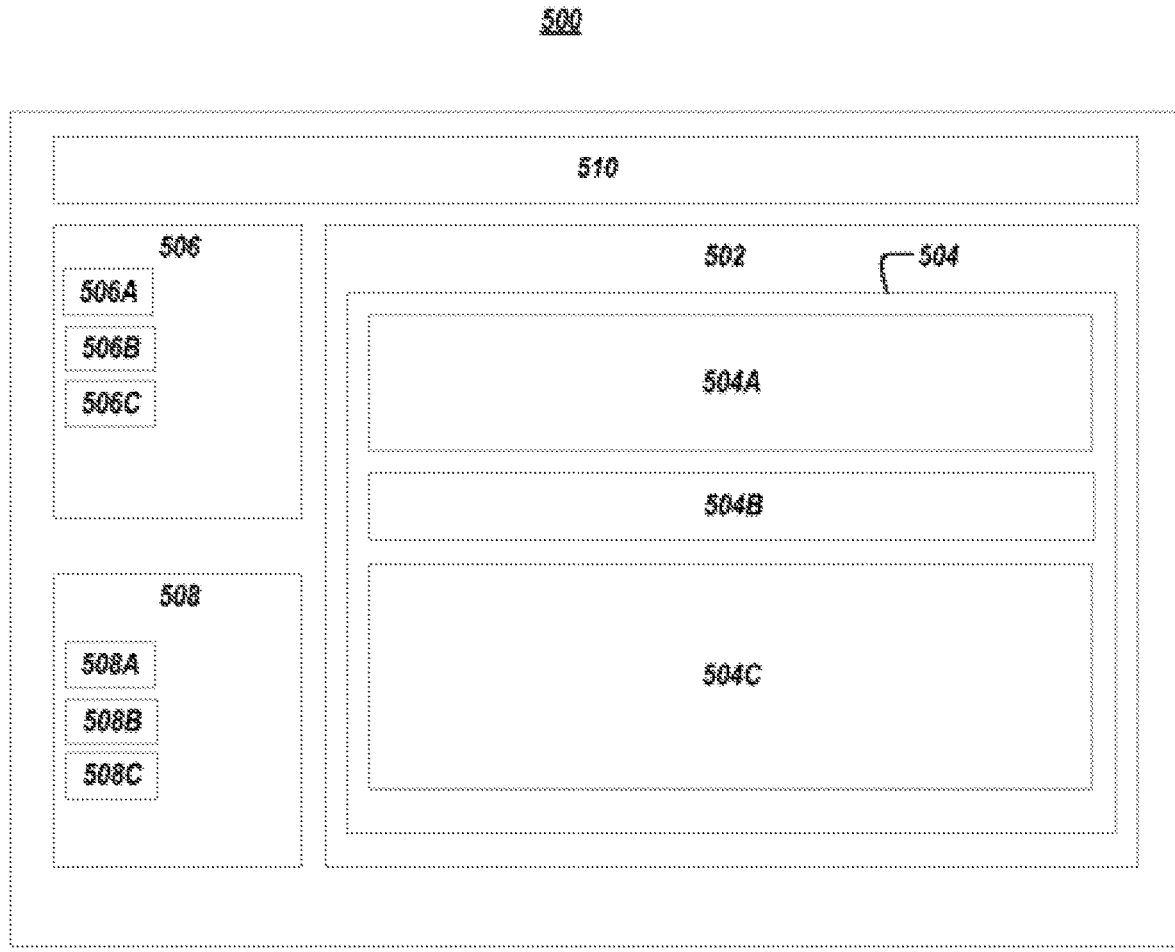
Figure 6:
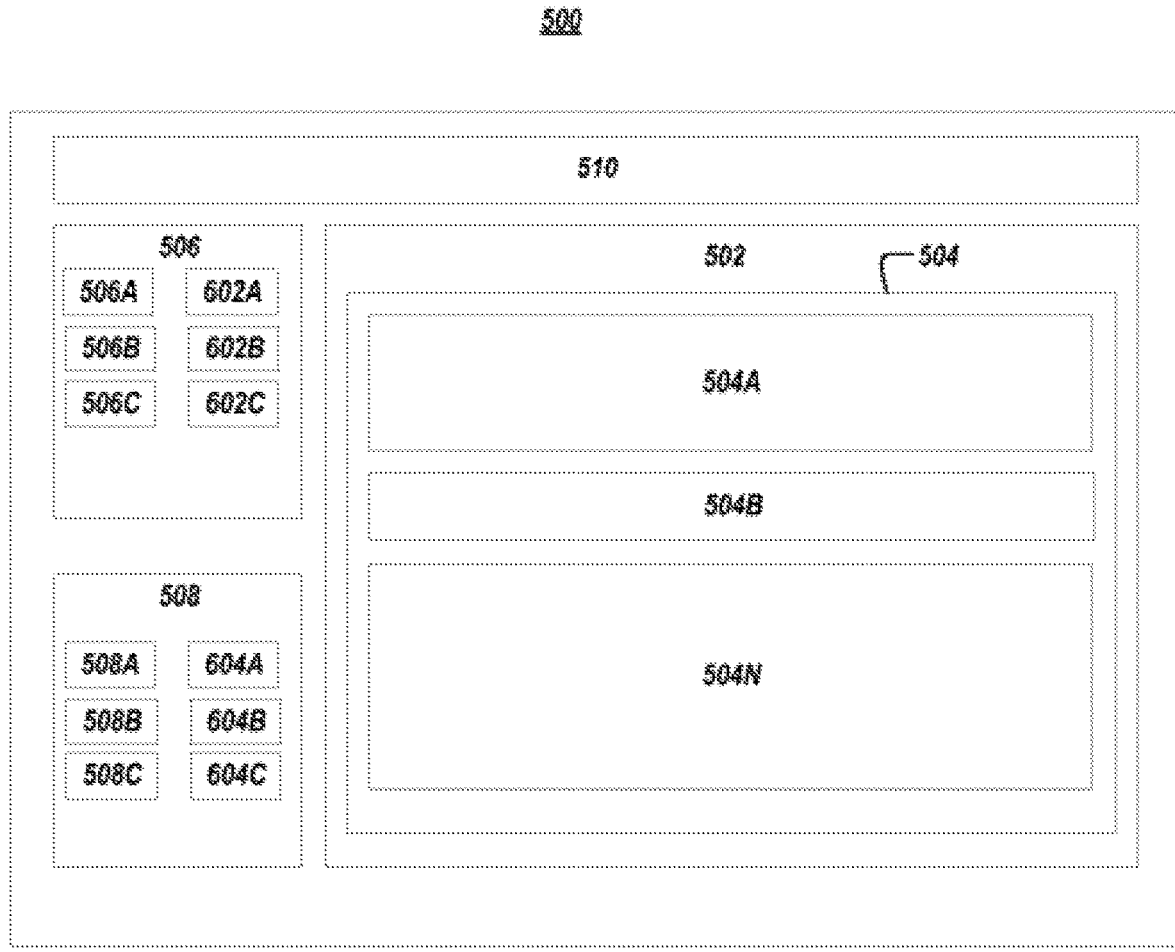

Having thus described certain embodiments of the present invention in general terms, reference will now be made to the accompanying drawings, which are not necessarily drawn to scale, and wherein:

FIG. 1 illustrates an example system within which some embodiments of the present invention may operate;

FIG. 2 illustrates a block diagram of an example device for implementing an improved system for extracting decision-relevant information from a data record comprising natural language information using special-purpose circuitry in accordance with some embodiments of the present invention;

FIG. 3 illustrates an example data flow interaction between elements of an example environment for extracting decision-relevant information from a data record comprising natural language information in accordance with some embodiments of the present invention;

FIG. 4 illustrates a flowchart describing example operations for implementing an improved network data security enforcement and verification system in accordance with some embodiments of the present invention;

FIG. 5 illustrates a block diagram of an example interface that may be generated and used in accordance with some embodiments of the present invention; and FIG. 6 illustrates another block diagram of an example interface that may be generated and used in accordance with some embodiments of the present invention.

DETAILED DESCRIPTION

Some embodiments of the present invention will now be described more fully herein with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

Overview

Various embodiments of the present invention are directed to improved apparatuses, methods, and computer program products for developing model training data, and trained machine-learning models, that are able to analyze and process large volumes of data records that contain qualitative and/or subjective observations and other information from a relatively unstructured, natural language document. In this regard, embodiments of the present invention provide systems, devices, and frameworks that generate an interface in which a user can view, assess, and operate on images of data records while capturing the actions taken by the user in a manner that allows for the user's actions within the interface (including but not limited to the user's interactions with the underlying data record) to be associated with the given data record and any coding and/or other assessments applied to the data record by the user. As a result, in situations where the underlying data takes the form of unstructured, natural language documents, a machine learning model may be trained to arrive at the same sorts of data assessments and/or categorizations that result from the carefully reasoned analysis that is traditionally performed by a human reviewer.

In many of today's modern networking and data processing environments, large volumes of data records must be processed and analyzed in order to maintain and perform mission-critical operative functions. While machine learning models and other automated data processing systems are often helpful in increasing data throughput and accelerating relatively simple data analysis functions, such models and systems are often incapable of effectively handling large volumes of unstructured data records (such as those that may include natural language narratives, subjective observations, and/or other information where the source of the underlying information has broad discretion in choosing the words used to convey information, for example) where humans traditionally must use complex reasoning and assessment skills to identify key information and properly categorize and/or otherwise process the information contained in the data record.

The inventors of the inventions disclosed herein have recognized that one of the key factors in limiting the ability of machine learning models to efficiently, accurately, and reliably assess and process complex, unstructured data records, such as those expressed in natural language, for example, is the limited ability of traditional training data sets to capture and reflect the higher-level analysis and discernment applied by human data analysts in similar contexts.

One such context in which traditional approaches to training machine learning models typically fail is medical record analysis. In many modern medical facilities, millions of medical records per day must be reviewed, processed, and categorized to ensure that patients and other entities are accurately and correctly billed for services. Since medical records are primarily designed to enable the safe and effective provision of healthcare services to a patient, such records often feature relatively unstructured passages expressed in natural language, where a physician, nurse, and/or other care provider captures and records potentially important information about a patient, their history, diagnosed and/or potential conditions, test results, other observations, additional information, and the like. In order to accurately review and assess such records to facilitate billing and payment for the relevant services (and to reduce the potential for billing waste, fraud, and/or error) such data must be analyzed and categorized.

In some modern medical environments, millions of such records and their related claims must be processed each day. In order to identify potential savings opportunities, some such medical environments may deploy and apply automated pre-payment analytics to each claim to make an initial assessment regarding the degree to which a given claim likely reflects a billing error, waste, or other deficiency. Such analytics may tag and/or otherwise identify records for which there is a high likelihood of such errors, wastes, and/or other deficiencies, and the underlying medical records are subsequently requested from the relevant providers. In some example situations, the medical records are received in the form of scanned images. Traditionally, these scanned images are then manually reviewed by one or more human reviewers to determine if the procedures and/or other services billed in a given claim (which may be expressed as one or more Current Procedural Terminology (CPT) codes, for example) are appropriately documented, and ultimately make the decision to either pay or deny the claim.

In some modern medical data processing environments, evaluation and management (E/M) CPT codes make up the largest volume of CPT codes for all professional claims across all of the given lines of care and/or other business associated with the medical environment. In many situations, such E/M CPT codes must be reviewed in accordance with particular documentation guidelines. In some such environments, the relevant guidelines may be expressed in the form of a checklist, such that key elements of a patient's history of present illness, review of symptoms, additional elements of a patient's past, family, and/or social history, examination, diagnosis and management, complexity, and risk are identified and captured. Based on the presence of the key elements, and in view of the reviewer's applied discernment and/or judgment, a determination (by one or more human reviewers) is made on whether the E/M CPT can be paid or denied. In many environments, even a common manual clinical review process can require ten minutes or more of focused attention for a human to complete.

In view of the large volumes of records and related claims that must be reviewed in connection with a medical system's required billing and claims assessment operations, the manual review process reflects a significant operational bottleneck. Moreover, the incremental savings that may be realized through the judicious identification of billing errors and/or other deficiencies is limited in its scalability, as the manual review required in traditional environments is limited by the number of trained human staff that can manually review the relevant records. To more rapidly assess the records (and thus potentially increase the savings associated with eliminating billing errors and other documentation deficiencies, staff headcount must be increased. As a result, the technical challenges that currently limit the ability of machine learning models and/or other machine learning tools to read and process natural language data records and/or other relatively unstructured data records creates an operational challenge.

To address these and other technical challenges associated with accurately and efficiently processing complex data records, extracting relevant information from natural language records and/or other relatively unstructured data, and overcoming the limitations of machine learning models in handling such information, example embodiments described and/or otherwise disclosed herein contemplate using a user interface to capture the user interactions with the relevant data records in order to build training data sets that capture and reflect the higher-order discernment and evaluation processes used by a human reviewer in evaluating potentially complex, unstructured data records.

In many example implementations, a user interface is used to leverage existing manual processes as data collection processes that result in a corpus of training data. This training data can in turn be used with a machine learning model to learn the complex relationships between input data (in the form of medical records, for example) and an output result in the form of a coded claim and/or a decision to accept and/or deny a claim. Upon the development of a sufficient corpus of training data (and its application to the relevant machine learning model), the training data compilation process can ultimately be bypassed, such that relevant medical records are passed directly to the machine learning model which may then produce one or more outputs, such as a checklist with accurately ticked boxes and/or a decision to pay or deny a given claim, for example.

As noted herein, some example embodiments of the invention described and/or otherwise disclosed herein create a corpus of training data that can be used to teach a machine learning model to appropriately and efficiently process complex medical records, other natural language documents, and/or other complex and/or unstructured data. In some example implementations of such embodiments, a user interface is deployed as a replacement for the basic, traditional document viewing and document-based checklist applications that are used in many conventional environments. In some such example implementations, the user interface combines a viewing pane, such that an image of the relevant data record can be viewed by the user, with the relevant checklist used to reflect the contents of the data record as it applies to a given decision process. By maintaining the checklist and the document within the same user interface, the interface is able to capture both the output of the view (such as the particular elements checked in the checklist) along with a set of additional user interactions (such as mouse clicks, selected text, other movements or manipulations of the image of the data record, or the like, for example) and store the captured data in persistent storage.

In example implementations where the user interface collocates the relevant data record (such as an image of a portion of a medical record, for example) with a checklist and/or other evaluation pane, additional information about a user's interaction with a data record can be captured and incorporated in to the model training data. For example, information related to the text that was visible in the record viewing pane at the time a particular checklist item or other selectable object was selected by the user can be used to establish association between portions of records (and, for example, the language and/or other material presented therein) and a particular checklist item. Over time, as the interface is used with multiple records and multiple reviewers, the existing record review process is automatically converted into a model training set that captures a broad array of user interactions that reflect the higher-level thought processes used by a reviewer in evaluating a record. For example, it may be valid to assume that the text viewable by a reviewer at the time a checklist item was selected or de-selected has a meaningful relationship to that checklist item, and that the content reflected in that text had an impact on the decision-making analysis performed by the user. By automatically capturing the correlation between the viewable text and the selected (or de-selected) item, the development of the training data set may be performed with minimal, if any, intrusion into or disruption of the natural analysis approach used by the human user.

In some example implementations, the interface further allows for a user to explicitly indicate which pieces of text and/or other portions of a document inform the selection and/or de-selection of a checklist item and/or similar selectable object within the interface. For example, a user may highlight or otherwise indicate within the interface that a given passage (such as a statement identifying a particular surgical operation performed several years prior, for example) was relevant when selecting a checklist item indicating that the patient had a one or more past surgeries. While the collection of such fine-grained user feedback imposes a slightly higher burden the reviewer, it simultaneously provides a powerful insight into the thought-process of the user and language used in a data record to drive a decision.

In some example implementations, upon the development of a sufficient corpus of training data extracted from the interface based on the actual actions of actual reviewers, a machine learning model may be built and used to operate directly on previously un-reviewed records to populate a checklist and/or other evaluation document and ultimately provide a recommendation regarding whether to approve and/or deny a claim. For example, the training data collected from the interface may be used to construct multiple binary machine learning classifier models, such as one per item of a given checklist, for example. In one such example implementation, the text from the implicitly captured pages on view when checklist ticks were made, and/or the more fine-grained feedback in the form of user-selected text may be used an input for such modules. To make the textual data more amenable to a machine learning model, a data preprocessing pipeline may be constructed, to convert the text data into matrices of numbers, for example, or other data formats. For example, a one-hot encoding approach, a word embedding approach, and/or other textual analysis tools may be used to convert the relatively unstructured, natural language text into a data format more readily processed by a machine learning model. Once in such a format (such as a vectorized and/or matrix format, for example, the data can then be used with any appropriate machine learning model (such as a support vector machine and/or a more advance deep learning model, such as a convolutional neural network, for example). After a training phase to tune the model's parameters (such as through the application of a train, validate, and test split, and/or an advanced k-fold cross validation approach, for example) the completed model may be deployed to operate over a new and/or otherwise previously unseen document and return checkmark ticks, confidence measures for each checkmark ticks in a checklist, and/or other evaluation indicia.

In example implementations involving the deployment of trained machine learning models (such as arrangements involving one machine learning model per checklist item, for example) a new and/or otherwise previously unseen medical record may be received and preprocessed (such as by using the same preprocessing pipeline used to refine the training data, for example). This preprocessed input data can then be applied as input to the models that were previously built and trained. In some example implementations, each model provides as output a confidence level that indicates how likely it is that the text in the relevant medical record support a tick for a given checklist item (such as in the form of a confidence of the binary classifier associated with the given checklist item, for example). In some such example implementations, a threshold may be set such that only classifiers that output a sufficiently confidence level will result in a tick being populated (and/or prepopulated) into a representation of the checklist presented in a user interface. In some such example implementations, a decision to pay or deny a claim related to the medical record and/or the related checklist may be made in accordance with a formulaic approach that extends the traditional calculation with variable weights, such that a weighted calculation (such as where the weights are associated with the confidence in the relevant ticks, for example) is performed. In some example implementations, the weights may be directly used, while in other example implementations, a threshold may be applied such that only checklist selection that meet the required threshold are included as component weighted values in the calculation to pay or deny a given claim.

In some example implementations, in order to provide feedback to a user viewing a machine-generated, pre-populated checklist on the level of confidence of the relevant machine learning classifier, the interface could be used to display the confidence level alongside the relevant tick mark and/or other indication in the user interface. For example a number (such as a "99.5% confidence", for example), a gradient shading (such as one where a darker and/or more saturated color indicates a higher confidence level, for example) may be presented in the interface.

By using a user interface to convert existing, human-mediated data analysis protocols into a corpus of training data that can be used to construct and train machine learning models to perform E/M CPT code clinical reviews and/or otherwise process relatively unstructured data records containing natural language information, the technical challenges described herein can be overcome, and further allow for the repurposing of human resources, effective scaling of machine-driven processes, increasing the throughput of analyzed data records, and/or other advantages. Moreover, because the training data is capable of incorporating input from a wide variety of users (and/or can be developed using a subset of highly trained and/or otherwise highly proficient users) the review of complex data records can be improved by making the review process more standardized (at least in the sense that the model(s) are likely to provide consistent, repeatable results), predictable, and capable of rapidly incorporating revised protocols and practices over those of a fully human-operated analysis approach.

Many of the example implementations described herein are particularly advantageous in situations and other contexts that involve the analysis and/or review of complex data records featuring natural language portions in network environments, such as those that may be associated with a hospital and/or other medical services provider. In some such situations, multiple different individuals may be involved with the traditional, human-mediated review and classification of records, such as medical records, that contain natural language and/or subjective language choices such that the users must each apply higher-level discernment and critical reading to map information contained in a record to a checklist and/or other evaluation metric. As such, and for purposes of clarity, some of the example implementations described herein use terms, background facts, and details that are associated with network environments associated with medical services providers and may reference information, considerations, and other details associated with implementations that may arise in such networks. However, it will be appreciated that embodiments of the invention and example implementations thereof may be applicable and advantageous in a broad range of contexts and situations outside of those related to networks associated with medical services providers.

Example Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As used herein, a "computer-readable storage medium," which refers to a physical storage medium (e.g., volatile or non-volatile memory device), may be differentiated from a "computer-readable transmission medium," which refers to an electromagnetic signal.

As used herein, the terms "user" and/or "client" refer to an individual or entity that is a user of a workstation that may be configured to access and/or store files within a network environment. For example, a user and/or client may be tasked with analyzing one or more files and/or other data records containing information associated with the providing of medical services, including but not limited to information that may be subject to regulatory requirements associated with the protection and preservation of potentially sensitive health and/or identification information.

The terms "workstation" and/or "client device" refer to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

As used herein, the term "data object" refers to a structured arrangement of data. A "record data object" is a data object that includes one or more sets of data associated with a given data record, such as a medical record and/or other data record that is used in connection with one or more decisions. In some example implementations herein, a record data object is a structured arrangement of data that contains a record image set, which may include images of a patient's medical records, images generated by medical imaging equipment, photographs, scanned documents, other images associated with a patient and/or their medical records, OCR and/or other extracted textual information associated with the medical records, and/or other data or metadata associated with a medical record.

As used herein, the terms "data set", "information set", and/or other specific "sets" refer to a collection of data. One or more information sets may be combined, incorporated into, and/or otherwise structured as a data object. A "record image set" is a data set that includes images of a patient's medical records (which may be referred to herein as one or more "record images"). A record image set may further incorporate OCR and/or other extracted textual information associated with the medical records, and/or other metadata associated with a medical record, and/or other related information, for example. A "selectable objects set" is a set of interface objects (such as checkboxes in a checklist, for example) that may be selected by a user in an interface. In some example implementations, a selectable object may be linked to a data model, such that the state of a selectable object (such as selecting and/or de-selecting the object) and/or changes to the state of the selectable object may be identified and stored in memory. As used herein, a "user action set" is a data set that includes one or more indications of actions taken by a user within a user interface with respect to a data record.

Example System Environment

FIG. 1 shows a more detailed depiction of example system environment 100 in which implementations involving the efficient generation of a training data set for a machine learning model capable of processing data records featuring natural language and/or other relatively unstructured content may be realized. The depiction of environment 100 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 1 and the environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

Embodiments implemented in a system environment such as system environment 100 advantageously provide for the receiving one or more record data objects associated with a given data record, the extraction of a record image set from the record data object, the rendering, in a user interface of a record image from the record image set, the rendering, in the user interface, of a selectable objects set, the collection of a user action set from the user interface reflecting a plurality of actions performed by a user within the interface, and the applying of the user action set to a training data set associated with a machine learning model, and/or the other actions described, contemplated, and/or otherwise disclosed herein.

As shown in FIG. 1, a decision analysis system 102 includes an online decision analysis system module 102A which is configured to receive, process, transform, transmit, and evaluate record data objects, the content and other information associated with such data objects, other data sets, and related interfaces via a web server, such as decision analysis system server 102B and/or decision analysis system device 102D. The decision analysis system server 102B and/or decision analysis system device 102D are connected to any of a number of public and/or private networks, including but not limited to the Internet, the public telephone network, and/or networks associated with particular communication systems or protocols, and may include at least one memory for storing at least application and communication programs. In some example implementations, the decision analysis system will be particularly configured to communicate with at least a record system 104 and one or more remote user systems 106.

It will be appreciated that all of the components shown in FIG. 1 may be configured to communicate over any wired or wireless communication network, including a wired or wireless local area network (LAN), personal area network (PAN), metropolitan area network (MAN), wide area network (WAN), or the like, as well as interface with any attendant hardware, software and/or firmware required to implement said networks (such as network routers and network switches, for example). For example, networks such as a cellular telephone, an 802.11, 802.16, 802.20 and/or WiMAX network, as well as a public network, such as the Internet, a private network, such as an intranet, or combinations thereof, and any networking protocols now available or later developed including, but not limited to, TCP/IP based networking protocols may be used in connection with system environment 100 and embodiments of the invention that may be implemented therein or participate therein.

As shown in FIG. 1, decision analysis system 102 also includes a decision analysis system database 102C that may be used to store information associated with record data objects, record images, record image sets, selectable object(s) sets, user action sets, training data sets, other data sets, interfaces associated with any such data objects or data sets, record systems, remote user systems, and/or any other information related to use of a user interface to capture user interactions with one or more record images to develop a training data set for use with a machine learning model. The decision analysis system database 102C may be accessed by the decision analysis system module 102A, the decision analysis system server 102B, and/or the decision analysis system device 102D, and may be used to store any additional information accessed by and/or otherwise associated with the decision analysis system 102 and/or its component parts. While FIG. 1 depicts decision analysis system database 102C as a single structure, it will be appreciated that decision analysis system database 102C may additionally or alternatively be implemented to allow for storage in a distributed fashion and/or at facilities that are physically remote from the each other and/or the other components of decision analysis system 102.

Decision analysis system 102 is also shown as including decision analysis system device 102D which may take the form of a laptop computer, desktop computer, or mobile device, for example, to provide an additional means (other than via a user interface of the decision analysis system server 102B) to interface with the other components of decision analysis system 102 and/or other components shown in or otherwise contemplated by system environment 100. In some example implementations, the decision analysis system device is the device through which a user is presented a user interface used to capture the user's interactions with a given data record in the development of a training data set.

Record data objects, file information sets and/or additional content or other information to be associated with one or more event data objects may originate from a record system such as record system 104. In some example implementations, the record system 104 may take the form of a file repository and/or a related system. A user of record system 104 may use a record server 104B, record system database 104C, and/or a device or interface associated therewith to interface with a record module 104A to create, generate, and/or convey a record data object and/or information to be included in record data object, such as a record image set and/or another data set. The record system 104 may (such as through the operation of the record module 104A, for example) transmit a record data object to the decision analysis system 102. While only one record system 104 is depicted in FIG. 1 in the interest of clarity, it will be appreciated that numerous other such systems may be present in system environment 100, permitting numerous users and/or other record sources to develop and transmit record data objects and/or information associated with record data objects to decision analysis system 102.

The record system database 104C may be accessed by the record system module 104A, and/or the record system server 104B, and may be used to store any additional information accessed by and/or otherwise associated with the record system 104 and/or its component parts. While FIG. 1 depicts event generation system database 104C as a single structure, it will be appreciated that record system database 104C may additionally or alternatively be implemented to allow for storage in a distributed fashion and/or at facilities that are physically remote from the each other and/or the other components of record system 104.

As shown in FIG. 1, system environment 100 also includes remote user system 106, which comprises a remote user module 106A, and a remote user device 106B. In some example implementations, the decision analysis system 102 may interact with the remote user system 106 to render, in an interface, one or more relevant record data images and selectable objects sets and capture the user's interactions with in the user interface and incorporate such user interactions into a user action set that may in turn be applied to a training data set. In such an arrangement, a user of a remote user system 106 need not be co-located with the decision analysis system 102 in order to interact with record images and selectable objects within the relevant interface.

While only one remote user system 106 is depicted in FIG. 1 in the interest of clarity, it will be appreciated that numerous additional such systems may be present in system environment 100, permitting numerous users to communicate and/or otherwise interact with the decision analysis system 102 and/or one or more record systems 104. As shown in FIG. 1, the remote user system 106 is capable of communicating with decision analysis system 102 to exchange information associated with interfaces, selectable objects, and record images that the decision analysis system 102 may provide when seeking to capture user interactions with respect to given record data object. For example, remote user system 106 may, such as via the capabilities and/or actions of the remote user module 106A and/or remote user device 106B, receive information necessary to render an interactive user interface on a display presented to a user, such that the user may assess files associated with one or more record data objects and related selectable objects.

Overall, and as depicted in system environment 100, decision analysis system 102 engages in machine-to-machine communication with record system 104 and remote user system 106, via one or more networks, to facilitate the processing of record data objects, such that one or more training data sets for use in connection with machine learning models may be developed based on the interactions of the user within a user interface.

Example Apparatus for Implementing Embodiments of the Present Invention

It will be appreciated that the decision analysis system 102 may be embodied by one or more computing systems, such as apparatus 200 shown in FIG. 2. As illustrated in FIG. 2, the apparatus 200 may include a processor 202, a memory 204, input/output circuitry 206, communications circuitry 208, record circuitry 210, interface monitoring circuitry 212, and training set circuitry 214. The apparatus 200 may be configured to execute any of the operations described herein, including but not limited to those described in connection with Figure, FIG. 3, FIG. 4, FIG. 5, and FIG. 6.

Regardless of the manner in which the apparatus 200 is embodied, the apparatus of an example embodiment is configured to include or otherwise be in communication with a processor 202 and a memory device 204 and optionally the input/output circuitry 206 and/or a communications circuitry 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 200 may optionally include input/output circuitry 206, such as a user interface that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 204, and/or the like).

The apparatus 200 may optionally also include the communication circuitry 208. The communication circuitry 208 may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

As shown in FIG. 2, the apparatus may also include record circuitry 210. The record circuitry 210 includes hardware, firmware, and/or software configured to maintain, manage, and provide access to a record data objects, including but not limited to those receive from record system 104. The record circuitry 210 may provide an interface, such as an application programming interface (API), which allows other components of a system to extract record image sets and/or other information from record data objects. For example, the record circuitry 210 may extract and/or format a record image set and/or record images from within a record image set, such that a user may be presented with rendered record image in an interactive user interface.

The interface monitoring circuitry 212 includes hardware, firmware, and/or software configured to manage, store, process, and analyze information (such record images, record image sets, selectable objects, selectable object(s) sets, and/or indications of user actions, for example) used in connection with providing a user interface to a user that facilitates the performance of one or more actions on record images presented to a user. In some example implementations, interface monitoring circuitry 212 is configured to provide collect indications of user interactions (such a mouse clicks, selections and/or de-selections of selectable object, selections and/or de-selections of portions of a record image, or the like, for example) and compile such user interactions into a user action set that may be compiled into a training data set.

The training set circuitry 214 includes hardware, firmware, and/or software configured to manage, store, process, and analyze information associated with user actions taken in connection with one or more record images presented in a user interface (such as those user actions that may be contained within a user action set, for example), and apply such information to a training set that may be used in connection with a machine learning model. For example, upon receiving an indication that a user has selected one or more selectable objects (such as checkboxes in a checklist, for example) immediately after clicking on, hovering over, and/or highlighting a portion of text in a record image, training set circuitry 212 may cause information regarding the relevant portion of the record image and the user action to be incorporated and stored in a training data set.

Example Processes for Data Loss Prevention Protocol Enforcement

FIG. 3 is a block diagram showing an example data flow 300 that may be used in connection with the efficient conversion of user interactions with in a user interface (which may be displaying a rendered record image and/or a set of selectable objects, for example) into a training data set for use in connection with the training of a machine learning model. As shown in FIG. 3, decision analysis system 102 is configured to receive one or more record data objects from record system 104 in the form of messages 302A-302N. In some example implementations, the record system 104 may provide a plurality of record data objects to the decision analysis system 102, such that the decision analysis system 102 may distribute record data objects (such as through causing record images from extracted record images sets, along with selectable object(s) sets, for example) into user interfaces associated with multiple users (including but not limited to those who may be operators of one or more remote user systems 106, for example) in a batched manner.

In some example implementations, upon receipt of a record data object from the record system 104, the decision analysis system 102 extracts a record image set from the record data object and renders a record image from the record image set and a selectable objects set (such as a series of checkboxes for a checklist, for example, in a user interface. As a user interacts with the user interface, the decision analysis system 102 collects a user action set that reflects the actions performed by the user within the user interface with respect to the rendered image and the selectable objects. This user action set may then be applied to a training data set associated with machine learning model 308. As shown in FIG. 3, depending on the configuration of the decision analysis system 102 and the 111 learning model 308, the training data set may be transmitted from the decision analysis system 102 to the machine learning model 308 to be applied as training data to the machine learning model 308. Alternatively, in situations where the training data is maintained at the machine learning model 308 and/or a related system, the user action set may be transmitted via message 304 to the machine learning model 308 for incorporation into the relevant training data set.

It will be appreciated that one of the goals of the example embodiments of the invention described and otherwise disclosed herein is to provide a trained model that is capable of receiving record data objects directly from the record system and appropriately processing the record data objects with minimal, and even without, human intervention. As such, there may be multiple cycles of instances of messages 302A-302N being transmitted to the decision analysis system 102 and multiple instances of message 304 transmitting training data (or information used to build training data) to machine learning model 308. In example implementations where the machine learning model 308 is determined to be sufficiently trained, the record system 104 may commence transmitting record data objects, as message 306, directly to the machine learning model 308. In such example implementations, the decision analysis system 102 may take on an alternative set of operations in the given network environment, such as actions involved with building new training sets for the machine learning model 308 and/or other models, and/or performing a subset of the actions normally performed by decision analysis 102.

FIG. 4 is a flow chart of an example process 400 for efficiently converting user actions within a user interface into training data reflecting higher-order user discernment and assessment for use in connection with machine learning models designed to process natural language data records and/or other relatively unstructured data. As shown at block 402, process 400 begins with receiving, at a decision analysis system, a record data object. As discussed herein, a record system may periodically provide one or more record data object to a decision analysis system. In some example embodiments, such as those that arise in the context of network environments associated with medical service providers and/or billing departments associated with medical service providers, the record data object may include medical records. However, it will be appreciated that the type of data incorporated in to the record data object may vary from context to context. As described herein, some example implementations are particularly well suited to situations where the underlying data in a record data object is expressed in natural language and/or other relatively unstructured data, including but not limited to situations where the records may reflect subjective language and usage choices, subjective and/or qualitative observations, and/or other information that is presented in a manner that traditionally requires the careful consideration and discernment of a human reviewer.

As shown at block 404, process 400 continues with extracting, from the record data object, a record image set. In some example implementations, the record image set includes one or more images, such as scanned images, for example, of a document that contains human-readable, natural language content. For example, in some situations, the record image set may include a series of scanned pages of a patient's medical records. In some example implementations of block 404, the record image set further includes a set of extracted character information associated with the document. As noted herein, some example implementations of embodiments of the invention described and/or otherwise disclosed herein arise in the context of reviewing medical records to decide whether to pay or deny a certain claim. In some such example implementations, the underlying relevant medical records may be provided in a record data object as a series of scanned images. It will be appreciated that while some of the example implementations discussed and/or otherwise disclosed herein use language associated with text-based medical records, some such example implementations contemplate and/or are configured to use any of a broad array of images associated with a user, a patient, and/or a relevant medical record. For example, the relevant medical record may contain one more pictures and/or other images captured and/or generated by a medical device, including but not limited to those associated with a colonoscope, endoscope, x-ray machine, MRI machine, camera, and/or other device that is capable of capturing or generating an image and/or other data associated with a patient and/or the relevant medical record. It may be advantageous to incorporate into the record data object and/or the relevant record image set, extracted character information (such as that which may be obtained using OCR protocols and/or other document analysis techniques) and/or other metadata associated with the relevant images, such as patient information, date and time information, and/or other information about the images that may assist in providing context for the records and/or enabling the record images to be effectively displayed to a user.

As shown in block 406, the process 400 involves rendering, in a user interface, a record image from the record image set. As described herein, example implementations of embodiments of the invention described and/or otherwise disclosed herein contemplate capturing user interactions with a record image within a user interface to form a training data set for use in connection with a machine learning model. As shown in FIG. 5, the record image may be presented in a pane and/or other region of an interface, such that a user may effectively read and/or otherwise review the content in the record image, click on, hover over, and/or select portions of the image, and/or otherwise review the content of the record image.

As shown in block 408, the process 400 also rendering, in the user interface, a selectable objects set. As shown in FIG. 5, some example implementations of block 408 involve presenting a set of selectable objects in the form of one or more checkboxes, for example in the same user interface as the presented record image. By providing both the record image and the set of selectable objects in the same interface, the user interface can be used, such as in connection with decision analysis system 102, to capture the ways a user interacts with a data record while determining what checklist items and/or other selectable items (which may reflect other categorizations of the record, for example), thereby enabling indications of the higher-level cognitive discernment applied by the user to a natural language and/or other relatively unstructured document to be captured for use in connection with a training data set.

As shown in block 410, the process 400 also includes collecting, from the user interface, a user action set, wherein the user action set comprises a plurality of action performed by the user within the user interface. In some example implementations, the selectable elements and/or other components of the interface linked back to various data modes, such that when a checkbox is ticked and/or otherwise selected a state, such as a "true" value, is recorded. Likewise, the data model may be structured such that when the checkbox is unchecked, a "false" value is recorded. The data models underlying the interface may be configured to capture a broad range of information, such as mouse clicks, mouse hovering operations, changes in status of one or more selectable objects, highlighting of text, and/or other interactions between the user and the interface.

In some example implementations, the user action set includes an indication of one or more selectable objects from within the selectable objects set and an identification of the record image. For example, if a user selects a given item from a checklist, an association may be created and recorded such that the content of the data record is associated with the characteristic and/or other quality associated with a given checkbox. In the context of a medical record, for example, if the checkbox indicates that the patient has had one or more prior surgeries, then the user action set, by including an indication of that checkbox and the record image, can be used to indicate that the content of the data record tends to lead a reviewer to the conclusion that the patient has had prior surgeries.

In another example implementation, the user action set comprises an identification of a set of user interactions within the interface. In some example implementations, it may be advantageous to track a user's mouse clicks within an interface, particularly if a user tends to click words and/or other portions of a record image in a small window of time before making a selection from the set of selectable objects. In such situations, the mouse click information may provide insight into the regions of a document image and/or particular language that tends to be relevant in making a determination regarding a particular checkbox and/or other aspect of the content of the document.

In some example implementations, the user action set may further comprise an identification of a portion of the record image associated with the one or more user-selected objects from within the selectable objects set. For example, at the time a selection of a checkbox and/or other selectable item is made, the interface may capture the portion of the record image that is viewable in the interface at that time. In such example situations, there is likely a correlation between the visible portion of the document and the selectable item, such that associating the portion of the record image with the selectable object likely constitutes information that would aid in training a model to associate similar passages with the selected item.

In some example implementations, the user action set may further comprise an identification of a user-selected portion of the record image associated with the one or more user-selected objects from within the selectable objects set. In some situations, it may be advantageous to capture a user-selected portion of a record image and associate it with a user-selection of a selectable object. For example, a user may highlight several words, a sentence, and/or a passage of a document that informed their selection of a particular checklist item and/or other selectable object. As such, there would be a close correlation between the selected item and the highlighted portions of the record, such that the user's input would likely constitute an important aspect of the training of a related machine model.

As shown in block 412, the process 400 also includes applying the user action set to a training data set associated with a machine learning model. With reference to FIG. 3, in some example implementations, the user action set may be applied to the training data set directly at the decision analysis system, such as decision analysis system 102. In other example implementations, such as when the training data set is maintained at a system associated with the machine learning model, the user action set may be applied to the training data set by transmitting the user action set to the machine learning model (and/or its related system).

Example User Interface

FIG. 5 depicts a block diagram of an example interface 500 that may be generated and presented to a user of a decision analysis system and/or a remote user system to allow the user to view and take action with respect to record images presented to the user in connection with one or more selectable objects. One of the significant features of the interface 500 is the ability for the interface and/or a related system to capture and store user interactions within the interface, such that a user action set may be compiled and incorporated into a training data set. One approach to allowing the interface to capture such information is to associate the interface and/or its component parts with one or more data models, such that user interactions (such a mouse clicks, selections, highlighting, and/or other interactions, for example) may be converted into a data value and stored, such as in a database associated with a decision analysis system.

As shown in FIG. 5, viewing pane 502 presents provides an area in which a record image may be presented to a user. As shown in FIG. 5, the record image 504 may contain multiple portions, shown as 504A-504N, containing natural language text and/or other information. For example, in some situations, the record image may be a portion of a patient's medical records, and the portions 504A-504N may reflect different entries presented on a given page and/or portion of a page presented as record image 504 in the viewing pane 502.

As shown in FIG. 5, selectable area 506 incorporates a number of selectable elements, 506A-506C, which, in some example implementations, are individually selectable boxes that are part of a checklist provided in area 506. Similarly, a second area 508 incorporates a number of selectable elements 508A-508C, which, like the selectable elements 506A-506C may be individually selectable portions of a checklist and/or another selectable element through which a user may provide an indication of the content and/or other relevant features of the record image 504. In some example implementations, each of the selectable elements 506A-506C and 508A-508C, and/or other portions of the interface, such as pane 502 and/or informational header 510 (which may provide information regarding the interface and/or incorporate a ribbon and/or other set of user functions, for example), are linked to one or more data models, such that user interactions with one or more portions of the interface 500 generate data values that can be captured and stored.

Regardless of the precise orientation, appearance, and/or functionality of the selectable elements 506A-506C and/or 508A-508C, upon the selection of one such button, the interface 500 may cause and indication of the action taken to be stored. In some example implementations, and as discussed herein, multiple different pieces of information may be captured from the interface to generate a user action set. For example, upon selection a selectable element, the interface may correlate the record image 504, a viewable portion thereof (such as portions 502A-504N, for example), any material in record 504 that was selected by a user, mouse click information, and/or other user interactions with the selected object, such that the user action set (and the related training data set) stores an association with a relevant aspect of the record image (and/or the content thereof) with the selected option. In such example implementations, and as discussed here, the relationships between aspects of the record image, the user's actions within the interface, and the selection of one or more selectable elements allow for the development of a training data set that reflects aspects of a user's higher-level thought processes that are engaged when discerning and interpreting natural language information and/or other complex data in order to make a selection.

As discussed herein once a machine learning model has been trained using a training data set, such as one developed through the use of the interface in FIG. 5, the machine learning model may be capable of performing at least an initial assessment of a new and/or previously unreviewed data record. As shown in FIG. 6, the interface 500 is further extended to include confidence assessments 602A-602C and 604A-604C. As discussed herein, the relevant machine learning model and/or models may be capable of determining a confidence level associated with the model's determination of whether a particular selectable element (such as a checkmark in a checklist) should be selected for a given record and/or record image. As such, a machine learning model may determine that one or more of the selectable objects 506A-506C and/or 508A-508C should be checked and/or otherwise selected for a given record. In some example implementation the confidence assessments 602A-602C and/or 604A-604C may take the form of numeric expressions, color coding, and/or other expressions indicating the confidence level of the model in the given determination. In some example implementations involving the instance of interface 500 in FIG. 6, a user may be able to correct and/or change the selection of a given selectable object, and, in some such example implementations, develop a further user action set in a manner similar to that discussed herein with respect to FIGS. 1, 3, 4, and 5.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, e.g., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a LAN and WAN, an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for automatically extracting decision-relevant information from a data record comprising unstructured data to generate a training data set for training one or more machine learning models, the method comprising:
receiving, at a decision analysis system comprising at least one processor, one or more memories and a network interface, a record image, wherein the record image is a single image of a plurality of record images within a record image set of a record data object;
presenting, by the decision analysis system in communication with a user computing device, a graphical user interface comprising an interactive viewing pane and an evaluating pane that are simultaneously visible within the graphical user interface, wherein:
the record image is displayed within the interactive viewing pane of the graphical user interface such that only a visible portion of the record image is displayed in the interactive viewing pane and a remainder of the record image is alternatively displayable by interacting with the interactive viewing pane;
the interactive viewing pane is interactive for collecting a user action set with respect to the record image; and
the evaluating pane comprises a plurality of selectable elements, wherein each of the plurality of selectable elements is configured to, upon activation thereof, assign a categorization to the record image;
receiving, by the decision analysis system a user action set comprising:
user input via the interactive viewing pane to cause display of the visible portion of the record image within the interactive viewing pane of the graphical user interface, wherein the visible portion of the record image comprises at least a first selectable portion and a second selectable portion; and
user input selecting the first selectable portion of the record image within the interactive viewing pane while the visible portion of the record image is displayed in the interactive viewing pane;
receiving, by the decision analysis system while the visible portion of the record image is displayed in the interactive viewing pane of the graphical user interface and while the first selectable portion of the record image is selected within the interactive viewing pane, user input activating at least one of the plurality of selectable elements of the evaluating pane to classify the first selectable portion of the record image;

receiving user input selecting the second selectable portion of the record image within the interactive viewing pane while the visible portion of the record image is displayed in the interactive viewing pane; and receiving, by the decision analysis system while the visible portion of the record image is displayed in the interactive viewing pane of the graphical user interface and while the second selectable portion of the record image is selected within the interactive viewing pane, user input activating at least one of the plurality of selectable elements of the evaluating pane to classify the second selectable portion of the record image;

responsive to receipt of the user input activating the at least one of the plurality of selectable elements for the first selectable portion of the record image, correlating, by the decision analysis system, activation of the at least one of the plurality of selectable elements with one or more relevant features of the first selectable portion of the record image, wherein the one or more relevant features are relevant for classifying the record image as a whole;

responsive to receipt of the user input activating the at least one of the plurality of selectable elements for the second selectable portion of the record image, correlating, by the decision analysis system, activation of the at least one of the plurality of selectable elements with one or more relevant features of the second selectable portion of the record image, wherein the one or more relevant features are relevant for classifying the record image;

generating, by the decision analysis system based on the correlation between the respective one or more relevant features and the corresponding at least one of the plurality of selectable elements, the training data set;

training, by the decision analysis system, the one or more machine learning models with the generated training data set;

automatically classifying, by the decision analysis system and using the trained one or more machine learning models, additional record images by determining a confidence level specific for each of the plurality of selectable elements for each of the additional record images and display the determined confidence level with the selectable element in the evaluating pane of the graphical user interface, wherein the confidence level is graphically depicted as: a numeric expression or a color code indicating whether the selectable element is correlated with one of the additional record images.

2. The method of claim 1, wherein the record image set comprises at least one image of a document, wherein the document comprises human-readable, natural language content.

3. The method of claim 2, wherein the record image set further comprises a set of extracted character information associated with the document.

4. The method of claim 1, wherein the first selectable portion of the record image was selected by a user corresponds with one or more of a mouse click or mouse hover operation.

5. The method of claim 1, wherein at least one of the plurality of selectable elements was selected by a user corresponds with one or more of a text selection or checkbox status modification.

6. An apparatus for automatically extracting decision-relevant information from a data record comprising unstructured data to generate a training data set for training one or more machine learning models, the apparatus comprising at least one processor and at least one memory comprising computer program code, the at least one memory and the computer program code configured to, with the at least one processor, cause the apparatus to:

receive a record image at a decision analysis system, wherein the record image is a single image of a plurality of record images within a record image set of a record data object;

present, via a user computing device, a graphical user interface comprising an interactive viewing pane and an evaluating pane that are simultaneously visible within the graphical user interface, wherein:
the record image is displayed within the interactive viewing pane of the graphical user interface such that only a visible portion of the record image is displayed in the interactive viewing pane and a remainder of the record image is alternatively displayable by interacting with the interactive viewing pane;
the interactive viewing pane is interactive for collecting a user action set with respect to the record image; and
the evaluating pane comprises a plurality of selectable elements, wherein each of the plurality of selectable elements is configured to, upon activation thereof, assign a categorization to the record image; receive a user action set comprising:
user input via the interactive viewing pane to cause display of the visible portion of the record image within the interactive viewing pane of the graphical user interface, wherein the visible portion of the record image comprises at least a first selectable portion and a second selectable portion; and
user input selecting the first selectable portion of the record image within the interactive viewing pane while the visible portion of the record image is displayed in the interactive viewing pane;

receive, by the decision analysis system while the visible portion of the record image is displayed in the interactive viewing pane of the graphical user interface and while the first selectable portion of the record image is selected within the interactive viewing pane, user input activating at least one of the plurality of selectable elements of the evaluating pane to classify the first selectable portion of the record image;

receive user input selecting the second selectable portion of the record image within the interactive viewing pane while the visible portion of the record image is displayed in the interactive viewing pane; and receiving, by the decision analysis system while the visible portion of the record image is displayed in the interactive viewing pane of the graphical user interface and while the second selectable portion of the record image is selected within the interactive viewing pane, user input activating at least one of the plurality of selectable elements of the evaluating pane to classify the second selectable portion of the record image;

responsive to receipt of the user input activating the at least one of the plurality of selectable elements for the first selectable portion of the record image, correlate activation of the at least one of the plurality of selectable elements with one or more relevant features of the first selectable portion of the record image, wherein the one or more relevant features are relevant for classifying the record image as a whole;

responsive to receipt of the user input activating the at least one of the plurality of selectable elements for the second selectable portion of the record image, correlate activation of the at least one of the plurality of selectable elements with one or more relevant features of the second selectable portion of the record image, wherein the one or more relevant features are relevant for classifying the record image as a whole;

generate, based on the correlation between the respective one or more relevant features and the corresponding at least one of the plurality of selectable elements, the training data set;

train the one or more machine learning models with the generated training data set;

automatically classify, using the trained one or more machine learning models, additional record images by determining a confidence level specific for each of the plurality of selectable elements for each of the additional record images and display the determined confidence level with the selectable element in the evaluating pane of the graphical user interface, wherein the confidence level is graphically depicted as: a numeric expression or a color code indicating whether the selectable element is correlated with one of the additional record images. images.

7. The apparatus of claim 6, wherein the record image set comprises at least one image of a document, wherein the document comprises human-readable, natural language content.

8. The apparatus of claim 7, wherein the record image set further comprises a set of extracted character information associated with the document.

9. The apparatus of claim 6, wherein the first selectable portion of the record image was selected by a user corresponds with one or more of a mouse click or mouse hover operation.

10. The apparatus of claim 6, wherein at least one of the plurality of selectable elements was selected by a user corresponds with one or more of a text selection or checkbox status modification.

11. A computer program product comprising at least one non-transitory computer-readable storage medium having computer-executable program code instructions stored therein for automatically extracting decision-relevant information from a data record comprising unstructured data to generate a training data set for training one or more machine learning models, the computer-executable program code instructions comprising program code instructions configured to:

receive, at a decision analysis system, a record image, wherein the record image is a single image of a plurality of record images within a record image set of a record data object;

present, via a user computing device, a graphical user interface comprising an interactive viewing pane and an evaluating pane that are simultaneously visible within the graphical user interface, wherein:

the record image is displayed within the interactive viewing pane of the graphical user interface such that only a visible portion of the record image is displayed in the interactive viewing pane and a remainder of the record image is alternatively displayable by interacting with the interactive viewing pane;

the interactive viewing pane is interactive for collecting a user action set with respect to the record image; and the evaluating pane comprises a plurality of selectable elements, wherein each of the plurality of selectable elements is configured to, upon activation thereof, assign a categorization to the record image; receive a user action set comprising:

user input via the interactive viewing pane to cause display of the visible portion of the record image within the interactive viewing pane of the graphical user interface, wherein the visible portion of the record image comprises at least a first selectable portion and a second selectable portion; and user input selecting the first selectable portion of the record image within the interactive viewing pane while the visible portion of the record image is displayed in the interactive viewing pane;

receive, by the decision analysis system while the visible portion of the record image is displayed in the interactive viewing pane of the graphical user interface and while the first selectable portion of the record image is selected within the interactive viewing pane, user input activating at least one of the plurality of selectable elements of the evaluating pane to classify the first selectable portion of the record image;

receive user input selecting the second selectable portion of the record image within the interactive viewing pane while the visible portion of the record image is displayed in the interactive viewing pane; and receiving, by the decision analysis system while the visible portion of the record image is displayed in the interactive viewing pane of the graphical user interface and while the second selectable portion of the record image is selected within the interactive viewing pane, user input activating at least one of the plurality of selectable elements of the evaluating pane to classify the second selectable portion of the record image;

responsive to receipt of the user input activating the at least one of the plurality of selectable elements for the first selectable portion of the record image, correlate activation of the at least one of the plurality of selectable elements with one or more relevant features of the first selectable portion of the record image, wherein the one or more relevant features are relevant for classifying the record image as a whole;

responsive to receipt of the user input activating the at least one of the plurality of selectable elements for the second selectable portion of the record image, correlate activation of the at least one of the plurality of selectable elements with one or more relevant features of the second selectable portion of the record image, wherein the one or more relevant features are relevant for classifying the record image as a whole;

generate, based on the correlation between the respective one or more relevant features and the corresponding at least one of the plurality of selectable elements, the training data set;

train the one or more machine learning models with the generated training data set;

automatically classify, using the trained one or more machine learning models, additional record images by determining a confidence level specific for each of the plurality of selectable elements for each of the additional record images and display the determined confidence level with the selectable element in the evaluating pane of the graphical user interface, wherein the confidence level is graphically depicted as: a numeric expression or a color code indicating whether the selectable element is correlated with one of the additional record images.

12. The computer program product of claim 11, wherein the record image set comprises at least one image of a document, wherein the document comprises human-readable, natural language content.

13. The computer program product of claim 12, wherein the record image set further comprises a set of extracted character information associated with the document.

14. The computer program product of claim 11, wherein the first selectable portion of the record image was selected by a user corresponds with one or more of a mouse click or mouse hover operation.

15. The computer program product of claim 11, wherein at least one of the plurality of selectable elements was selected by a user corresponds with one or more of a text selection or checkbox status modification.

* * * * *

UNITED STATES PATENT AND TRADEMARK OFFICE
CERTIFICATE OF CORRECTION

| | |
|---|---|
| PATENT NO. | : 11,449,710 B2 |
| APPLICATION NO. | : 16/017185 |
| DATED | : September 20, 2022 |
| INVENTOR(S) | : Foley et al. |

It is certified that error appears in the above-identified patent and that said Letters Patent is hereby corrected as shown below:

In the Claims

Column 27
Line 22, "record images. images." should read --record images.--

Signed and Sealed this
Twenty-fifth Day of October, 2022

*Katherine Kelly Vidal*

Katherine Kelly Vidal
*Director of the United States Patent and Trademark Office*